United States Patent [19]

Bowers et al.

[11] 3,726,285

[45] Apr. 10, 1973

[54] BODY ORGAN STIMULUS PULSE GENERATOR WITH DECOUPLED TIMING CIRCUIT AND VOLTAGE MULTIPLIER

[75] Inventors: David L. Bowers; Theodore P. Adams, both of Wauwatosa, Wis.

[73] Assignee: General Electric Company, Schenectady, N.Y.

[22] Filed: Apr. 26, 1971

[21] Appl. No.: 137,545

[52] U.S. Cl. ................128/419 P, 128/422, 331/111
[51] Int. Cl. ...............................................A61n 1/36
[58] Field of Search.....................128/419 C, 419 E, 128/419 P, 419 R, 421, 422; 331/111

[56] References Cited

UNITED STATES PATENTS

| 3,109,430 | 11/1963 | Tischler | 128/419 P |
| 3,432,772 | 3/1969 | Johnson et al. | 337/111 |
| 3,508,167 | 4/1970 | Russell, Jr. | 128/422 |
| 3,547,127 | 12/1970 | Anderson | 128/419 P |

Primary Examiner—William E. Kamm
Attorney—Frank L. Neuhauser, Oscar B. Waddell and Joseph B. Forman

[57] ABSTRACT

A timing circuit establishes pulse repetition rate and pulse width and cooperates with a pulse generating output circuit which delivers to an organ a series of stimulating pulses at one of several available pulse energy levels. Low voltage d-c sources are used for driving the timing and output circuits. The output circuit is adapted to selectively double or triple the source voltage and raise the output pulse amplitude to above the response threshold of the organ with an adequate margin of safety. Interaction between the pulse timing and output circuits is minimized. An externally operable magnetic reed switch is used to transfer the stimulus pulse generator from the doubler to the tripler mode.

16 Claims, 1 Drawing Figure

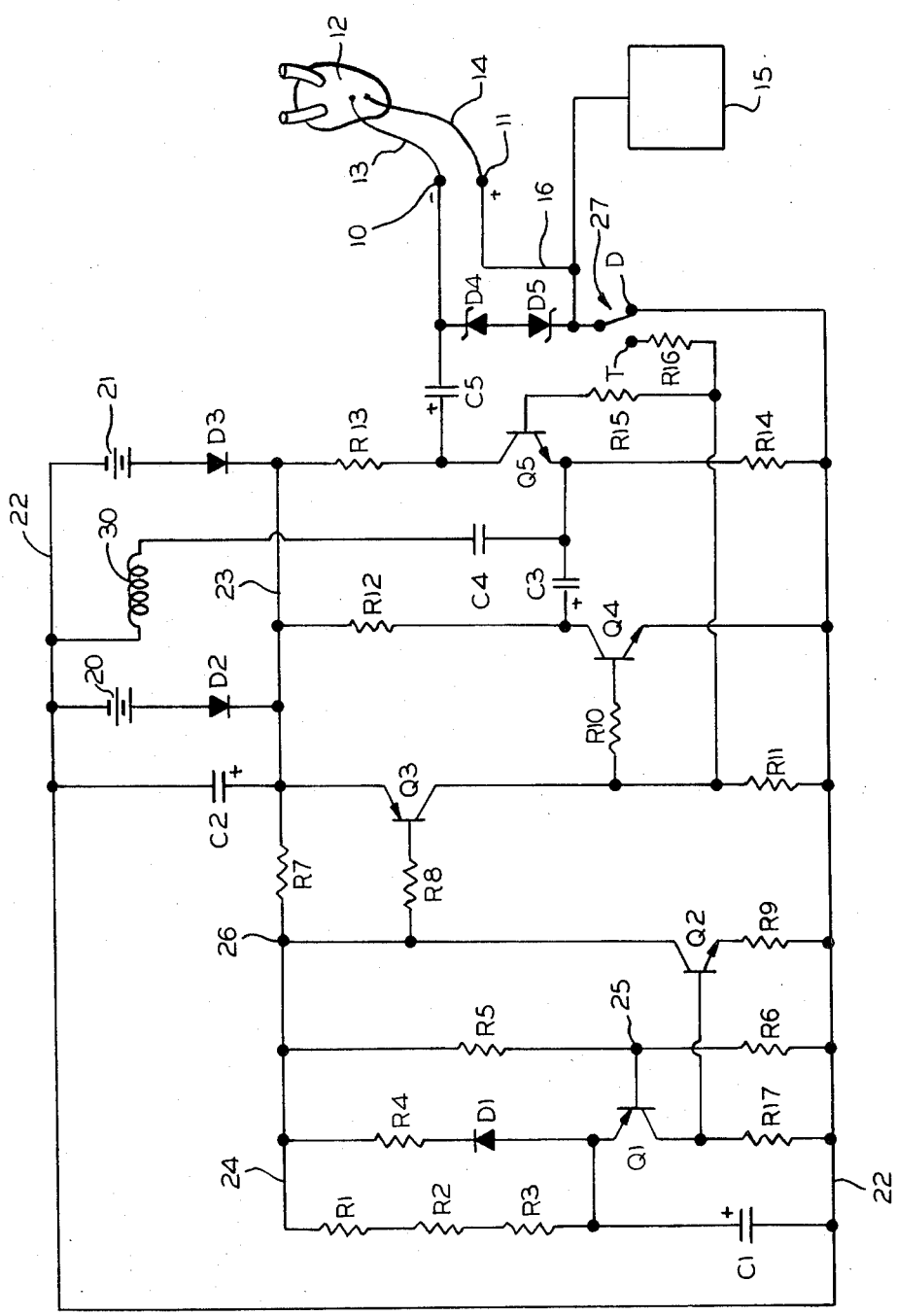
INVENTORS
DAVID L. BOWERS
THEODORE P. ADAMS
BY
ATTORNEYS

BODY ORGAN STIMULUS PULSE GENERATOR WITH DECOUPLED TIMING CIRCUIT AND VOLTAGE MULTIPLIER

BACKGROUND OF THE INVENTION

It is well known that electric body organ stimulators such as cardiac pacers should have long-term stability in respect to stimulus pulse repetition rate, pulse width, pulse amplitude and output energy. Among the problems that have been encountered in the design of pulse generators attempting to fulfill these requirements is that conduction in the output or load circuit causes interaction with the timing pulse generator circuit which leads to greater variability and unpredictability of the aforementioned parameters as the d-c source voltage such as that derived from depleting batteries diminishes. Hence, prior design efforts have been directed to stabilizing all parameters, particularly pulse repetition rate. This is not necessarily desirable, however, since a predictable drop in pulse rate and heart rate can be used to signal impending battery depletion.

SUMMARY OF THE INVENTION

Briefly stated, the present invention involves a stimulus pulse generator which has two principal functional blocks, a pulse timing circuit and an output or load circuit which has a voltage doubler and a tripler. Both functional blocks are powered by paralleled d-c sources such as batteries. Steering diodes are used in the battery circuits to cause most, if not all, load current to be delivered by one battery until it is nearly depleted and then to gradually transfer the load automatically to the other battery. The advantage of this arrangement is that the individual paralleled batteries will be drained more heavily than if an equal number of batteries were connected in series. At low current drains the utilization factor is low and this can be manifested in high internal battery impedance.

The pulse timing circuit depends on a time constant circuit including a capacitor and a resistor for establishing pulse repetition rate. Capacitors in the load circuit are charged simultaneously with charging of the timing capacitor but load capacitor charging takes place in an interval which is short compared to the interval during which the timing capacitor is being charged. During the charging periods, all transistors in the stimulator are nonconductive and therefore do not affect battery voltage regulation nor the timing interval. The transistors in the device are only used as switches. They all switch or become conductive simultaneously at a precise moment coinciding with the end of the timing interval.

In the doubler mode, two capacitors are charged in parallel and discharged serially through an impedance which is low and essentially that of the organ itself. When the device has been mechanically switched to the tripler mode, the load capacitors are charged as in the doubler mode but they are discharged in series with the battery so that almost three times source voltage is produced at the output terminals which are connected to the organ.

An object of this invention is to provide a body organ stimulator whose output parameters exhibit long-term stability and substantial independence of variations in the characteristics of circuit elements such as transistors and which does not vary in rate except in response to battery voltage changes.

Another object of this invention is to operate a stimulator from paralleled batteries which handle the load one at a time and which effectuate a small but measurable pulse repetition rate change when one battery becomes depleted and the other becomes active, this rate change being detectable externally of the stimulator and serving as an indication that a reasonably definite portion of the total available battery energy has been consumed.

A further object of this invention is to provide a stimulator with a coil that radiates an externally detectable signal upon initiation and termination of a stimulus pulse so that the pulse rate and width can be determined externally at any time during the life of the stimulator. An adjunct to this object is to connect the radiating coil in the output or load circuit of the stimulator in such manner that it does not introduce any radiated interference which it may receive into the rate generating circuitry nor into the stimulator circuitry except, perhaps, during delivery of a pulse when reception of interfering radiation becomes insignificant.

A further object of this invention is to accomplish all of the aforementioned objects by using a minimum number of circuit elements and to thereby increase reliability of the stimulator.

A further object is to adapt the timing capacitor discharge circuit for precise control of pulse width and to decouple the timing circuit from the charging voltage source during capacitor discharge and to decouple the load circuit at the same time.

How the foregoing and other more specific objects are achieved will appear from time to time throughout the course of the ensuing more detailed description of a preferred embodiment of the invention in reference to the drawing.

DESCRIPTION OF THE DRAWING

The single drawing shows a schematic circuit diagram of an organ stimulator embodying the invention.

DESCRIPTION OF A PREFERRED EMBODIMENT

The output terminals of the stimulator appear at the right side of the drawing and are marked with the numerals 10 and 11. An organ such as a heart 12 may be connected to the output terminals by means of heart attachment leads comprising conductors 13 and 14. When both conductors 13 and 14 terminate in the heart, the stimulator is said to be operating in the bipolar mode. The stimulator may also be operated in the unipolar mode by using an indifferent electrode plate 15 which may be implanted in body tissue remotely from the organ which is being stimulated. In the unipolar mode, stimulus signals are delivered from terminal 10 to heart 12 and back through intervening body tissue to plate 15 and to terminal 11 by way of a jumper 16. The indifferent electrode plate 15 may be embedded in the wall of the resin encapsulation for the implantable stimulator and may be concealed under removable insulation until the unipolar mode is desired. Plate 15 may also be separately implanted and connected to the stimulator if desired. The other elements of the stimulator are usually encapsulated in a resin which is coated with silicone rubber so that the stimulator may be implanted in body tissue.

The stimulator power supply comprises two batteries 20 and 21 which have their negative terminals in this case connected to line 22 and their positive terminals respectively connected to the anodes of diodes D2 and D3. The cathodes of these diodes connect to positive line 23. A relatively large filter capacitor C2 is connected across the batteries and the negative and positive lines 22 and 23. Peak current drawn from either one of the batteries may be as high as five milliamperes whereas average current drain in a stimulator of this type is usually in the vicinity of 30 microamperes.

Diode D2 may be a silicon diode having a forward voltage drop of about 0.4 volts and diode D3 may be the Schottky hot carrier type which has a forward voltage drop of about 0.2 volts. Thus, battery 21 conducts preferentially through diode D3 and battery 20 and diode D2 will gradually conduct when battery 21 is nearly depleted. This will occur at some point in time intermediate the total life of the two batteries. The individual battery output voltages may be about one-half of the voltage required to stimulate the heart so the stimulator must transform battery voltage to higher amplitude stimulus signal voltage which appears on output terminals 10 and 11.

The pulse timing circuitry will be discussed first for which purpose attention is invited to the left side of the circuit diagram. The elements for establishing the pulse interval or repetition rate include timing resistors R1, R2 and R3 which are connected in series with timing capacitor C1 across positive line 24 and negative line 22. The timing capacitor charges through R1, R2 and R3 to a voltage level that is determined by a bias network or voltage divider comprising R5 and R6. The base of a transistor Q1 is connected to the junction point 25 between R5 and R6. When the voltage on capacitor C1 exceeds the sum of the voltages at point 25 and the emitter to base drop of transistor Q1, transistor Q1 conducts and begins to discharge C1 for initiating the rise portion of a timing pulse. The timing cycle is repeated about 72 times per minute in heart stimulators. One of the discharge paths of C1 is through the load terminals, namely emitter and collector of transistor Q1 and R17. The voltage developed on R17 is applied to the control terminal or base of a transistor Q2 which goes into saturation very quickly. Q2 has a comparatively small resistor R9 in its emitter circuit as one means for limiting capacitor discharge current and this resistor, of course, also affects pulse width.

The charging time of C1 determines the pulse repetition rate and its discharge time determines the pulse width. Pulse width control is obtained by using a Schottky diode D1 in series with a pulse width determining resistor R4. The top of R4 connects with line 24 and to a junction point 26 which is separated from the battery source terminals by a relatively high resistor R7. When C1 is charging, the junction point 26 of R1, R4, R5, R7, and R8 are all near battery potential, that is, junction point 26 is near battery potential. However, during the discharge cycle of C1, junction 26 changes to near ground or negative potential due to the high conductivity or saturation of Q2. This results in all current from the capacitor C1 and any current through R7 from the battery flowing to ground during discharge of C1, thereby decoupling the battery from the timing circuit and eliminating any effect it might otherwise have on pulse width.

During the discharge cycle of C1, some of its current is diverted from transistor Q1 through diode D1 and resistor R4 to ground point 26. This diversion of current causes Q1 to turn off sooner than it would if the capacitor could discharge only through Q1 and Q2 and it reduces the timing pulse width to about one millisecond or less if the proper values of R4 and R9 are used. Note that transistors Q1 and Q2 are nonconductive during the charging cycle of C1. It will appear that none of the transistors in the stimulator circuit are conductive during the charging cycle. They are used merely as switches and are either all on or all off.

Capacitor C1 actually discharges through several separate paths two of which have been mentioned and another of which includes charging resistors R1 to R3. When C1 discharges to a voltage level which is not sufficient for forward biasing transistor Q2, the latter turns off and another C1 charging cycle begins.

Besides allowing precise control over pulse width, another important feature of the timing circuit is that it undergoes a slight but intentional drop in pulse rate as battery voltage drops due to depletion or transfer of power from one battery to another by means of the steering diodes D2 and D3. The rate decline of about two pulses per minute for a 0.5 volt battery drop notifies the patient and physician that the second battery stage is in use or becoming depleted and that stimulator replacement should be contemplated within a certain period. This approach has advantages over prior stimulators in which a constant rate was designed for and a dangerously increasing rate was sometimes obtained.

Pulse rate decline in the timing circuit that is herein disclosed results from the non-linear relationship between voltage on capacitor C1 and voltage at bias circuit junction 25 as source voltage changes. Thus, as source voltage falls, a greater time will be required to develop the necessary voltage difference between C1 and point 25 to forward bias Q1 and pulse initiation will be delayed repeatedly.

Two output or load circuit capacitors C3 and C5 in the pulse generator are charged simultaneously with timing capacitor C1. The charging circuit for capacitor C3 begins at positive line 23 and continues through resistor R12, capacitor C3 and a resistor R14 which is connected to negative line. The charging time of C3 is long compared to its own discharge time but is very short compared to the charging time of timing capacitor C1. The other load circuit capacitor C5 is also charged at the same time as is C3. The charging circuit for capacitor C5 begins at positive line 23 and includes resistor R13, capacitor C5, organ 12, and a single pole-double throw magnetic reed switch 27 which is connected to negative line. One of the stationary reed switch contacts is marked T and the other D. When the switch is engaging the D contact as shown, the stimulator is in the voltage doubler or low energy mode. When the switch is transferred to the T contact, the stimulator is in the voltage tripler or high energy mode. Capacitor C5 is also charged rapidly in comparison with the charging of timing capacitor C1 but is charged slowly in comparison with its discharge time.

Because of the slow charging rate of capacitor C5, current flowing through the heart 12 is insufficient to stimulate it. On the other hand, rapid discharge of C5 does produce a high enough current to stimulate the heart. The low charging current through c5 and its high discharging current flow in equal and opposite directions through the heart. This so-called biphasic stimulation is physiologically beneficial since it reduces metal ion migration from the heart attachment electrodes and prevents their polarization, thereby reducing stimulation threshold. When capacitors C3 and C5 become fully charged the output circuit remains inactive until initiation of a pulse by the timing circuit.

As explained earlier, when a timing pulse is initiated, Q2 goes into saturation. Transistor Q3 also goes into saturation as do transistors Q4 and Q5. It will appear that transistors Q4 and Q5 are involved in rapid discharge of load capacitors C4 and C5 to effect a stimulating pulse.

Transistor Q3 has a bias resistor R8 connected between its base and the collector of Q2. When Q2 conducts, Q3 is forward biased from positive line 23 though R8, Q2 and its emitter resistor R9. Q3 begins to conduct and quickly goes into saturation. This causes a voltage to be developed across R11 which is the collector resistor of Q3. This voltage is applied through R10 to the base of a transistor Q4, forward biasing the latter into conduction. The voltage developed on R11 by virtue of conduction by Q3 is also applied to transistor Q5 through a biasing resistor R15. This causes transistor Q5 to conduct. Conduction by Q4 and Q5 allows a discharge path for load capacitors C3 and C5. Starting with the left or positive plate of capacitor C5, this series discharge path includes Q5, C3, Q4, part of negative line 22, the D contact of magnetic reed switch 27, jumper 16, heart 12, and finally the right or negative plate of C5. Due to the very low discharge impedance in this circuit, a high stimulus current is conducted through the heart which is limited primarily by the relatively low impedance of the heart itself. Heart impedance is usually in the rang of between two hundred and one thousand ohms, and capacitors C3 and C5 do not completely discharge before timing circuit transistor Q2 goes off after which transistors Q3, Q4 and Q5 quickly turn off.

A feature of the output circuit just described which helps to provide high current to the heart load is its ability to substantially double the d-c source voltage. At the initiation of a pulse, the emitter of Q5 is driven through a potential which is below ground by an amount approximately equal to the battery voltage due to the rapid discharge of C3. When Q5 saturates an instant later, the positive or left plate of C5 is switched essentially from battery voltage B+ to −B+, a change which produces a potential of about −2B+ which is double the battery voltage across the heart load with one side of the heart referenced to battery ground.

Another higher value of stimulus voltage and current may be supplied to the heart, if the physiological needs of the patient dictate, by transferring magnet reed switch 27 to the T contact. This puts the output circuit in a voltage tripling mode. In this mode the charging path for C3 remains the same, that is, charging occurs from the positive line through R12, C3 and R14 to negative line. C5 charges through a different path than in the doubler mode. In the tripler mode, the charging path for C5 originates at positive line 23 and continues through R13, C5, heart 12, T contact of switch 27, current limiting R16 and R11 to negative line 22. Note that in the tripler mode, both capacitors C3 and C5 again charge for a long period compared with a discharge time and for a short period compared with the timing pulse interval.

In the tripler mode, when a pulse is initiated, a −2B+ potential is developed at the heart side of the output capacitor C5 due to the voltage doubling circuit as before. However, with Q3 saturated the other output terminal is not longer referenced to ground, but is switched to B+. Hence, with respect to the battery ground, a −2B+ potential exists on one output terminal and a +B+ on the other terminal. This is a difference of three B+ across the heart 12, and is thus substantially triple the battery voltage.

The discharge circuit in the tripler mode includes the battery voltage which is additive to the voltages on capacitor C3 and C5, thus producing voltage tripling. The discharge path may be considered to originate at the left or positive plate of capacitor C5. From this point the discharge circuit includes Q5, C3, Q4, negative line 22 to the negative side of the batteries, through the batteries to the positive line 23, then through transistor Q3 and switch 27 to the heart 12 and to the negative side of capacitor C5. With capacitors C3 and C5 charged to battery voltage and with battery voltage added, source voltage is tripled but stimulus voltage is reduced by the diode drops in the transistors and diodes in which case if battery voltage is about 2.7 volts as in one embodiment, a stimulus pulse of approximately 6.0 volts or a little more will be applied to heart 12.

A notable feature of the stimulator is that stimulus voltage tripling does not employ any electronic components in addition to those used for doubling except for the battery which is present anyway. Another important feature is that of maximizing decoupling of the load and timing circuits resulting from driving Q3 in the load circuit from the collector of Q2 which is driven from the timing circuit.

To permit detection of the stimulus pulse rate and interval externally of the body a radiating coil 30 is provided. One end of coil 30 is connected to negative source line 22. The other end is connected to one side of a small capacitor C4 whose other side is connected to the junction point 31 intermediate C3 and the emitter of Q5. It will be evident then that between between pulses, when the transistor including Q4 and Q5 are off, capacitor C4 will be isolated and that it will have zero charge on both sides. Isolation is adequate because of the relatively high values of R14 and R15. This isolation prevents the coil circuit from feeding into the stimulator circuitry any interference signals which might be Picked up from outside the stimulator such as from electric shavers, ignition noise and the like. Coil 30 is also effectively isolated from the timing circuit so it will not discharge timing capacitor C1 prematurely.

During a pulse, when Q5 is on and its emitter goes below ground potential, C4 charges and discharges at the beginning and end of the pulse. This produces a radiated signal from coil 30 which indicates the beginning and terminal edge of a pulse. The radiated signal comprises a damped oscillation at the beginning of a pulse and another lower amplitude oscillation at the end of the pulse. Thus, an external detector, not shown, can determine pulse width and rate using this radiated information.

An incidental feature of the load circuit is the use of two back-to-back connected zener diodes D4 and D5 to limit the heart signal if necessary and to prevent introduction into the stimulator of excessive stray currents that may appear if a patient's heart is subjected to defibrillation in an emergency.

Those versed in the electronics art will appreciate that the stimulator can be designed and operated complementarily. That is, battery potentials, diode polarities and transistors can be reversed respectively, changing PNP transistors to NPN and vice versa. As shown, indifferent electrode plate is anodic. If polarities are reversed, the plate will become cathodic without any electrolytic deterioration in the event of leakage currents in this circuit.

Although an embodiment of the invention has been described in detail, such description is to be considered illustrative rather than limiting, for the invention may be variously embodied and is to be limited only by the claims which follow.

We claim:
1. A body organ stimulus pulse generator comprising:
   a. source terminal means adapted to connect to an electric power source,
   b. stimulus pulse generating means adapted to be supplied from said terminal means when connected to a source and having output terminals adapted to be connected to a body organ,
   c. decoupling impedance means having one terminal connected to one source terminal and having another terminal,
   d. pulse timing means for controlling said stimulus pulse generating means and including a series circuit comprising a charging resistor means and a timing capacitor in series therewith, said series circuit being connected between said another terminal of said decoupling impedance means and the other source terminal for charging said timing capacitor,
   e. a first switch means responsive to development of a predetermined voltage on said capacitor by discharging the same and thereby producing a timing pulse,
   f. a second switch means connected between said another terminal of said decoupling impedance means and said other source terminal, means operatively connecting said first switch means to said second switch means for causing said second switch means to conduct in response to conduction of said first switch means, conduction by said second switch means effectively connecting said another terminal of said impedance means to said other source terminal whereby to substantially remove source voltage from said timing means and thereby decouple said timing circuit from said source and said pulse generating means during discharge of said timing capacitor.

2. The invention set forth in claim 1 wherein:
   a. said first and second switch means are switching transistors.

3. The invention set forth in claim 1 wherein:
   a. said first switch means is a transistor switch having a control terminal and load terminals,
   b. a voltage divider biasing circuit connected between said another terminal of said decoupling impedance means and said other source terminal and having an intermediate point connected to said control terminal,
   c. one of said load terminals of said first switch means being connected to the junction of said timing capacitor and charging resistor and responding to the difference between said predetermined voltage on said timing capacitor and the voltage at said intermediate point by turning on said transistor,
   d. load resistor means connected between another of said load terminals of said first switch means and said other source terminal,
   e. diode means and resistor means series connected between said one load terminal and said another terminal of said decoupling impedance means to divert some capacitor current from said first transistor switch means, thereby providing pulse width control means.

4. The invention set forth in claim 3 wherein:
   a. said second switch means is a transistor having a control terminal and load terminals, said control terminal being connected to the aforesaid load resistor means and becoming biased to turn on said second transistor switch when said first transistor switch is on and conducting through said load resistor means, said control terminal of said second switch means also being connected to said another load terminal of said first transistor switch means,
   b. one of said second transistor load terminals being connected to said decoupling impedance and the other load terminal being connected to said other source terminal,
   c. said pulse generating means being driven from one load terminal of said second transistor.

5. The invention set forth in claim 1 wherein said pulse generating means includes:
   a. a first load capacitor and a charging resistor means connected in a series circuit between said source terminals,
   b. a second load capacitor having one side connected to one terminal that is adapted for connecting to an organ and a charging resistor means connected to the other side of said second load capacitor in a series circuit, said last named series circuit being connected between said source terminals,
   c. third switch means connected between said other side of said second load capacitor and one side of said first load capacitor, and fourth switch means connected from the other side of said first load capacitor to the other terminal that is adapted for being connected to an organ and said fourth switch means also being connected to said other source terminal to turn on in response to initiation of a pulse by said timing circuit to thereby discharge said load capacitors in series through an organ and to apply substantially double the source voltage to the heart.

6. The invention set forth in claim 5 including:
   a. fifth switch means having one load terminal connected to one source terminal and having another load terminal, and means for turning said fifth switch means on in response to initiation of a timing pulse, b. a double-throw mode selector switch means connected to an organ connecting terminal and having selective conductive paths to said another load terminal of said fifth switch means and to said other source terminal, c. means responsive to turn on of said fifth switch means for controlling said third and fourth switch means to turn on simultaneously with said fifth switch means and said fourth switch means then connecting said other side of said first load capacitor to said other source terminal, d. turn on of said third, fourth and fifth switch means establishing a series circuit including said last named switch means, said load capacitors, said source terminals, the path to said fifth switch means of said selector switch, and said organ connecting output terminals, whereupon substantially the sum of said source and load capacitor voltages is applied to the organ connecting terminals.

7. A body organ stimulus pulse generator comprising:

a. source terminal means adapted to connect to an electric source, b. a pulse timing circuit connected between one and another of said source terminals and operative to produce timing pulse signals at a rate corresponding with the desired stimulating rate of an organ, c. pulse generating means including output terminals adapted to be connected to an organ and including a first switch means that is connected to said one source terminal and that is turned on in response to initiation of a timing pulse signal and is turned off between such signals, d. a first load capacitor and charging resistor means connected in a series circuit between said source terminals, e. a second load capacitor and a charging resistor means connected in a series circuit including said organ connecting terminals, said last named series circuit being connected between said source terminals, said first and second load capacitors being charged through their respective charging resistor means between timing pulses, f. a normally off second switch means connected from said first load capacitor to said another source terminal, g. a normally off third switch means connected between said load capacitors, h. means responsive to turn on of said first switch means for turning on said second and third switch means upon initiation of a timing pulse and to effect a closed series discharge circuit including said load capacitors, said second and third switch means and said organ connecting terminals, whereby to stimulate an organ at substantially the sum of the voltages on the two load capacitors.

8. The invention set forth in claim 7 including:

a. a double-throw mode selector switch means in said load capacitor discharge circuit, said selector switch means having at least one selectable conductive path leading to said first switch means and to said one source terminal to which it is connected, said second switch means having another conductive path leading to said another source terminal and a common terminal connected to one of said organ terminals, b. whereupon turning on of said first, second, and third switch means in response to a timing pulse will connect said load capacitors and said source in series with said organ connecting terminals.

9. The invention set forth in claim 7 including:

a. a radiating coil and a capacitor in series with each other and connected between a source terminal and a junction between said first load capacitor and said third switch means, whereupon turning said switch means on results in conduction through said coil and said capacitor and radiation of a signal from said coil.

10. A body organ stimulator comprising:

a. first and second terminals adapted to be connected to an electric source, b. pulse generator means having input terminals connected to said source terminals and having output terminals adapted to be connected to an organ, c. decoupling impedance means having a first terminal connected to said first source terminal and having a second terminal, d. timing circuit means having input terminals respectively connected in a circuit between said second impedance terminal and said second source terminal, said timing mean having an output terminal means on which a signal is produced for each timing period, e. switch means having a control element coupled with said timing circuit output terminal and having a load circuit connected between said second impedance terminal and said second source terminal, a timing signal on said control element rendering said switch means conductive whereby to effectively connect the input terminals of said timing circuit during a timing signal and thereby substantially isolate said circuit from said source and said pulse generator, and f. means for operating said pulse generator to produce pulses in response to occurrence of timing signals, 11. A body organ stimulator comprising:

a. first and second terminals adapted to be connected to an electric source, b. pulse timing means for producing short duration timing pulses with a predetermined period, said timing means having input terminals connected between said first and second terminals, c. pulse generator means having output terminals which are adapted to be connected to an organ, said generator comprising, i. a series circuit including a first capacitor, first switch means, a second capacitor and second switch means connected between said output terminals, ii. means for charging said first and second capacitors individually to substantially source voltage when said switch means are not conductive, and iii. means for rendering said first and second switch means conductive in response to occurrence of a timing pulse, whereby to apply the sum of the voltages on said capacitors to said output terminals, 12. The invention set forth in claim 11 wherein:

a. there is a decoupling impedance means interposed between one of said pulse timing means input terminals and one of said source terminals, b. switch means having a control element and a load circuit controllable thereby, said load circuit being connected between one of said source terminals and the junction between said impedance and said timing means input terminal, c. said last named switch means also being rendered conductive in response to a timing pulse, whereby to effectively connect the input terminals of said timing pulse generator together during occurrence of a timing pulse.

13. A body organ stimulator comprising:
a. first and second terminals adapted to be connected to an electric source,
b. pulse timing means for producing short duration timing pulses with a predetermined period, said timing means having input terminals connected between said first and second terminals,
c. pulse generator means having output terminals which are adapted to be connected to an organ, said generator comprising,
   i. a series circuit including a first capacitor means connected to one of said output terminals, first switch means connected to said first capacitor means, second switch means and a second capacitor means connected between said first and second switch means, said second switch means also connecting said second capacitor means to said second source terminal.
   ii. means for charging said first and second capacitor means individually to substantially source voltage when said first and second switch means are not conductive,
   iii. third switch means in a circuit between first source terminal and the other of said output terminals,
   iv. means for rendering said first, second and third switch means conductive in response to occurrence of a timing pulse, whereby to apply the sum of the voltages on said capacitors and the voltage on said source terminals to said output terminals.

14. The invention set forth in claim 12 wherein:
a. there is a decoupling impedance means interposed between one of said pulse timing means input terminals and one of said source terminals,
b. switch means having a control element and a load circuit controllable thereby, said load circuit being connected between one of said source terminals and the junction between said impedance and said timing means input terminals,
c. said last named switch means also being rendered conductive in response to a timing pulse, whereby to effectively connect the input terminals of said timing pulse generator together during occurrence of a timing pulse.

15. A body organ stimulator comprising:
a. one and another terminals adapted to be connected to an electric source,
b. a pulse timing circuit having input terminals and an output terminal for producing pulses with a predetermined period,
c. a decoupling impedance means connected between one of said timing circuit input terminals and one of said source terminals,
d. second switch means having a control element and a load circuit the latter of which is connected in a circuit between one of said timing circuit input terminals and the other of said source terminals, said timing circuit output terminal being coupled with said control element to render said load circuit conductive upon occurrence of a timing pulse, whereby to effectively connect said input of said pulse timing circuit together and thereby isolate said timing circuit from the source terminals during a timing pulse,
e. a pulse generator having input terminals connected to said source terminals and having output terminals adapted to be connected to an organ, and
f. means for turning on said pulse generator to produce a pulse on its said output terminals in response to occurrence of a timing pulse.

16. The invention set forth in claim 15 wherein:
a. said pulse timing circuit comprises,
   i. charging resistor means and a timing capacitor in a series circuit therewith, said circuit being connected between said timing circuit input terminals,
   ii. first switch mean responsive to development of a predetermined voltage on said timing capacitor by conducting and discharging said capacitor and thereby producing a timing pulse for controlling said pulse generator, said switch means having a control element connected to a point intermediate said timing capacitor and said resistor means,
   iii. pulse width control means including diode means connected to said control terminal, to said capacitor and to one of said input terminals,
   iv. said second switch means connected between said timing circuit input terminals,
   v. means for controlling said second switch means to conduct in response to conduction by said first switch means,
   vi. conduction by said second switch means providing a path for conduction through said diode means whereby to divert capacitor current from said control element and thereby control the duration of said timing pulse.

* * * * *